US011890880B2

(12) United States Patent
Fallica

(10) Patent No.: US 11,890,880 B2
(45) Date of Patent: Feb. 6, 2024

(54) PRINTER WITH EASY OPENING AND FIRMLY SECURED CLOSURE

(71) Applicant: K.F.I. S.R.L., Binasco (IT)

(72) Inventor: Antonino Giovanni Fallica, Pioltello (IT)

(73) Assignee: K.F.I. S.R.L., Binasco (IT)

( * ) Notice: Subject to any disclaimer, the term of this patent is extended or adjusted under 35 U.S.C. 154(b) by 0 days.

(21) Appl. No.: 17/509,884

(22) Filed: Oct. 25, 2021

(65) Prior Publication Data

US 2022/0126611 A1 Apr. 28, 2022

(30) Foreign Application Priority Data

Oct. 26, 2020 (IT) ........................ 102020000025234

(51) Int. Cl.
*B41J 29/02* (2006.01)

(52) U.S. Cl.
CPC ..................................... *B41J 29/02* (2013.01)

(58) Field of Classification Search
CPC .......... B41J 29/02; B41J 29/13; B41J 15/042; B65H 2301/41386; B65H 2402/442; B65H 2402/45; B65H 2801/12
See application file for complete search history.

(56) References Cited

U.S. PATENT DOCUMENTS 6,345,782 B1 * 2/2002 Nakayama ............. B41J 15/042 400/607.2
8,179,411 B2 * 5/2012 Takabatake ............ B41J 15/042 347/220
2017/0120645 A1 5/2017 Ishikawa et al.
2017/0182792 A1 * 6/2017 Tanizaki .................. B41J 2/325

FOREIGN PATENT DOCUMENTS

CN 101096154 B 10/2011
WO 2001003939 A1 1/2001
WO 2012004754 A1 1/2021

OTHER PUBLICATIONS

Italian Search Report and Written Opinion for corresponding IT202000025234, dated Jul. 28, 2021, 10 Pages.

* cited by examiner

*Primary Examiner* — Justin Seo
*Assistant Examiner* — Tracey M McMillion
(74) *Attorney, Agent, or Firm* — Armstrong Teasdale LLP

(57) ABSTRACT

A printer includes a support structure the is fixed in use, and in which a receptacle is formed for receiving a roll of paper tape. The printer also includes a cover hinged to a rotation axis substantially parallel to the unwinding axis of the roll of paper tape, and which is oscillatable between a closed position and an open position in which it covers and uncovers the receptacle, respectively. The printer also includes a printing device carried by the support structure, and a transport roller for paper tape unwound from the roll of paper tape, cooperating with the printing device. The cover includes a control member arranged on a flank of the cover and operable manually to disable a latching system and unlock the cover from the closed position. A control member is connected to the operating element, which may be rotated according to the opening direction of the cover.

8 Claims, 14 Drawing Sheets

PRINTER WITH EASY OPENING AND FIRMLY SECURED CLOSURE

This invention relates generally to printers.

More specifically, the invention relates to a printer, in particular for thermal paper, comprising

- a support structure which is fixed in use, and in which a receptacle is formed for receiving a roll of paper tape which is unwound in use by rotation about an axis;
- a cover which is hinged to said structure about a rotation axis substantially parallel to the unwinding axis of said roll, and which is oscillatable between a closed position and an open position in which it covers and uncovers said receptacle, respectively;
- a printing device carried by the support structure;
- a transport roller for the paper tape unwound from said roll, cooperating with the printing device, said roller being carried by the cover in such a way that it is coupled to/uncoupled from the printing device as a result of the closing or opening of the cover;
- latching means configured to lock the cover in the closed position; and
- at least one control member arranged on at least one flank of the cover and manually operable to disable the latching means and to unlock the cover from the closed position.

A printer of this type is described, for example, in publication WO 2012/004754 A1, by the same Applicant.

Said printers are called "easy loading" (or "drop in"), as their configuration with the transport roller separable from the printing device allows the paper roll to be easily loaded into the receptacle or roll-holder compartment.

Printers are known to be equipped with various latching systems, particularly latching systems that lock the cover by holding the transport roller. Typically, the cover is unlocked in different ways. For example, WO 01/03939 A1 describes a printer in which the cover is unlocked by lifting a control lever. The direction of movement of the lever, however, contrasts with the direction of movement of the cover, and therefore performing the operation of opening the cover may not be immediately intuitive.

An object of this invention is to provide a printer to overcome the drawbacks outlined above for printers according to the prior art.

This and other objects are achieved according to the invention with a printer of the type initially defined, wherein

- said at least one control member is connected to at least one operating element arranged on at least one flank of the cover and hinged to said cover about an axis substantially parallel to the rotation axis of the cover, wherein said at least one operating element is configured to engage at least one striker element arranged on at least one flank of the support structure, said at least one operating element being associated with at least one elastic member configured to urge said at least one operating element in a rotation direction concordant with the rotation direction of the cover from the open position to the closed position,
- wherein said at least one control member is operable to rotate said at least one operating element in a rotation direction concordant with the rotation direction of the cover from the closed position to the open position, to unlock the cover from the closed position.

In a printer according to such a solution idea, the direction of rotation of the operating element to actuate the release of the latching device is concordant with the direction of rotation of the cover. In this way the cover is easier to open.

According to an embodiment, said at least one operating element comprises at least one latching element configured to engage said at least one striker element to lock the cover in the closed position,

- wherein said at least one elastic member is configured to urge said at least one latching element in a rotation direction concordant with the rotation direction of the cover from the open position to the closed position,
- wherein said at least one control member is operable to rotate said at least one latching element in a rotation direction concordant with the rotation direction of the cover from the closed position to the open position, to disengage said at least one latching element from said at least one striker element.

According to this embodiment, there is therefore a latching system that may be added to those that may already be provided to hold the cover or the transport roller. This provides a particularly effective lock that holds the cover even in "difficult" conditions, for example, in applications on mobile vehicles (buses, trains, cabs, etc.) that cause strong vibrations on the printer.

According to another embodiment, said at least one operating element comprises at least one cam profile configured to cooperate with said at least one striker element to cause the cover to rotate relative to the support structure when said at least one operating element is subjected to a rotation relative to the cover according to a rotation direction concordant with the rotation direction of the cover from the closed position to the open position.

The action of the cam profile facilitates the operation of opening the cover, as it generates a considerable force to separate the cover from the closed to the open position, allowing at the same time for the cover to be opened with a very low force exerted by the user.

According to a particularly preferred embodiment, said at least one operating element comprises both a coupling element and a cam profile.

Further features and advantages of the invention will appear from the detailed description that follows, given purely by way of non-limiting example and with reference to the accompanying drawings, wherein:

FIGS. 1, 2 and 3 are perspective views of a printer according to the invention, shown respectively with the cover arranged in the closed position, in an intermediate position, and in the fully open position;

FIG. 1*a-c* are respectively a perspective view, a cross-sectional view and a wireframe representation of the printer according to FIG. 1, in the fully opened position and loaded with a paper roll;

Figure 12:
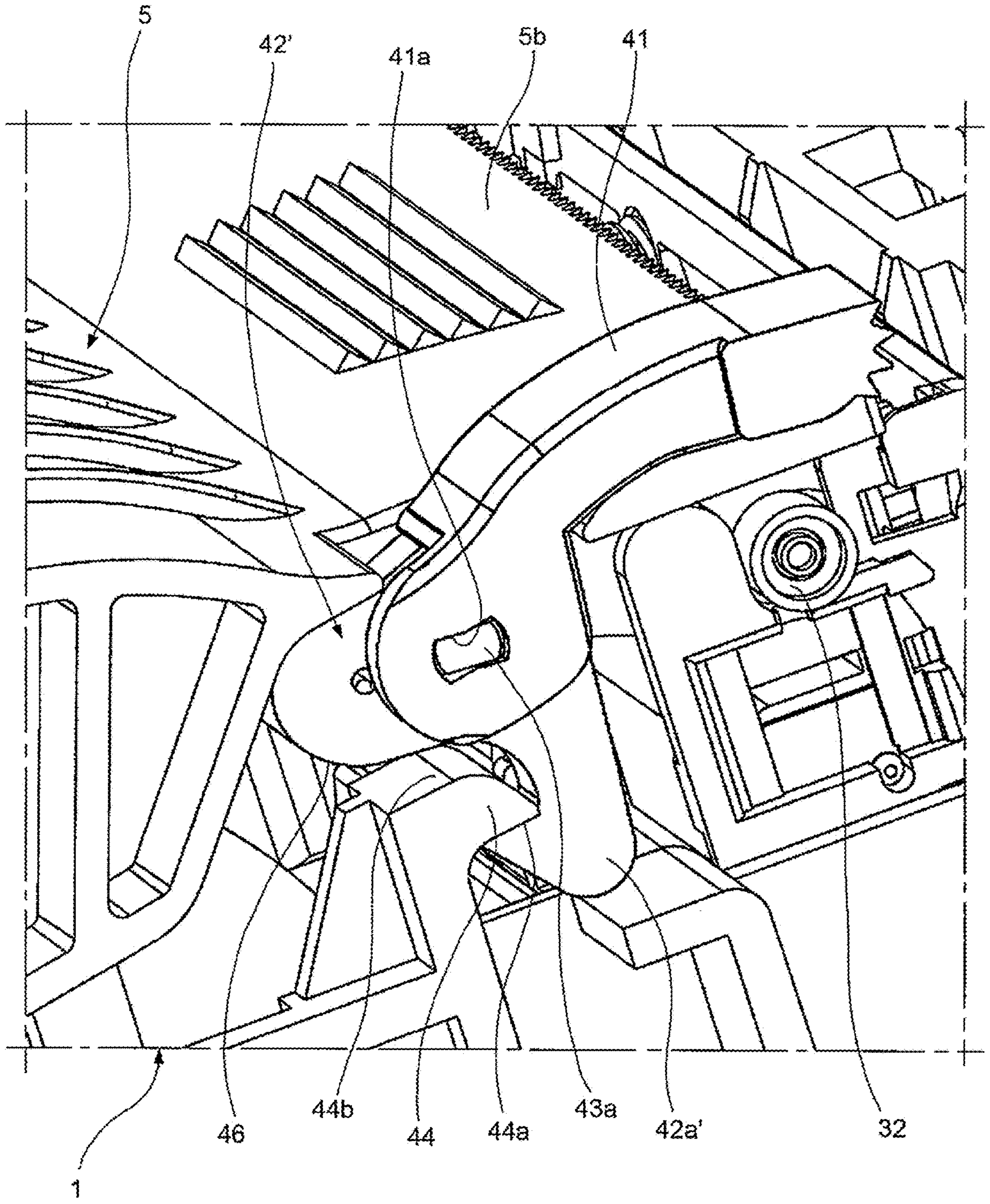
FIG. 12 is a detail view illustrating a second embodiment of the invention.
Figure 13A:
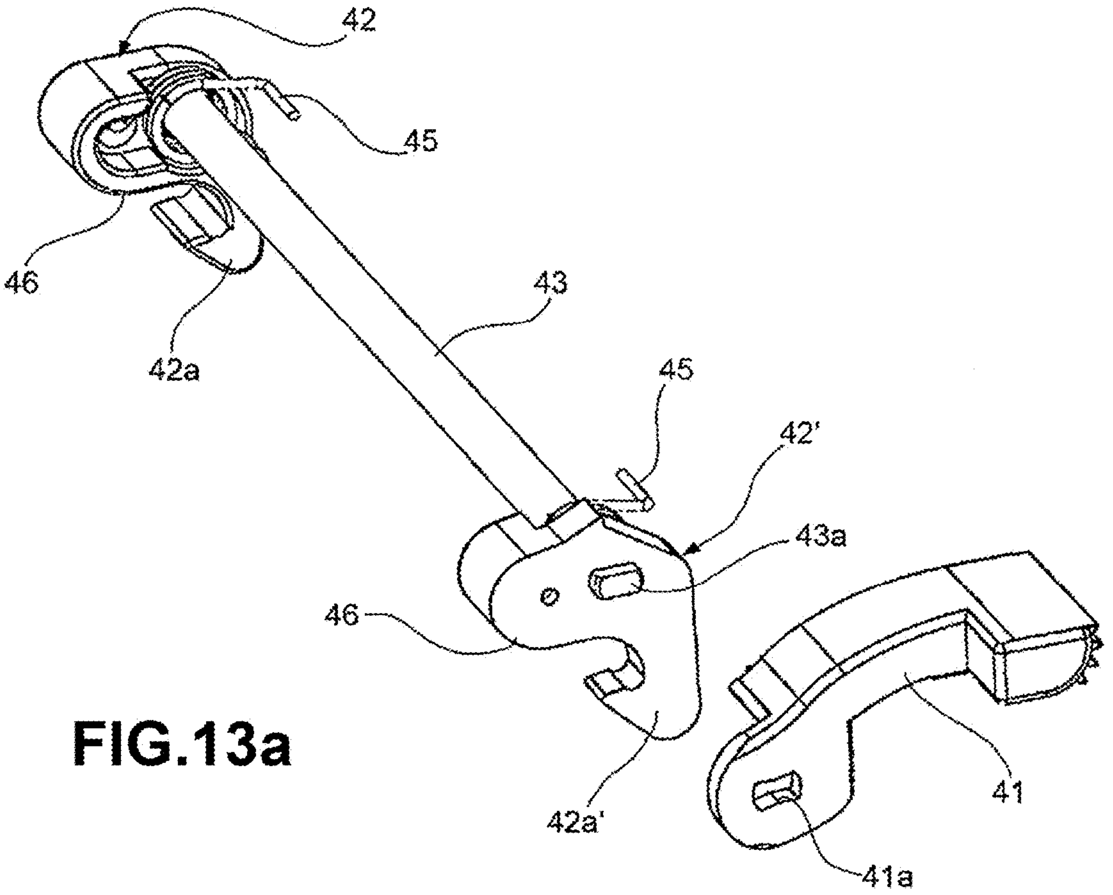
Figure 13B:
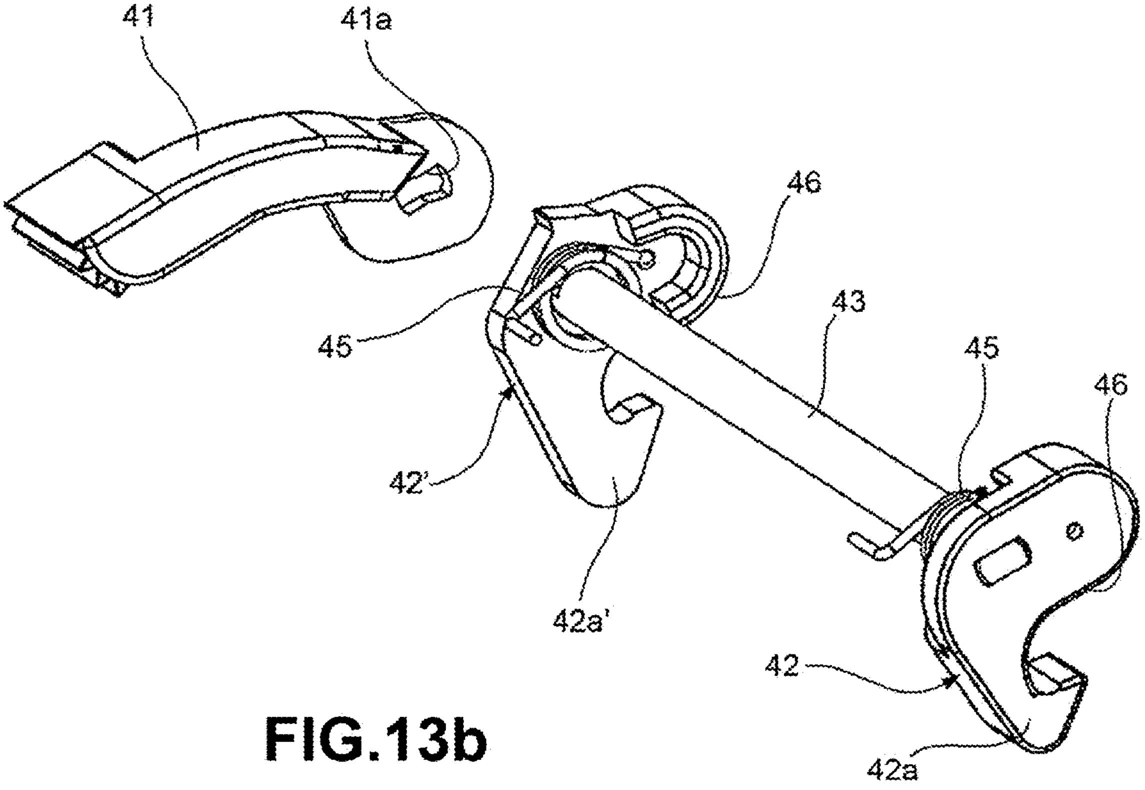
Figure 14:
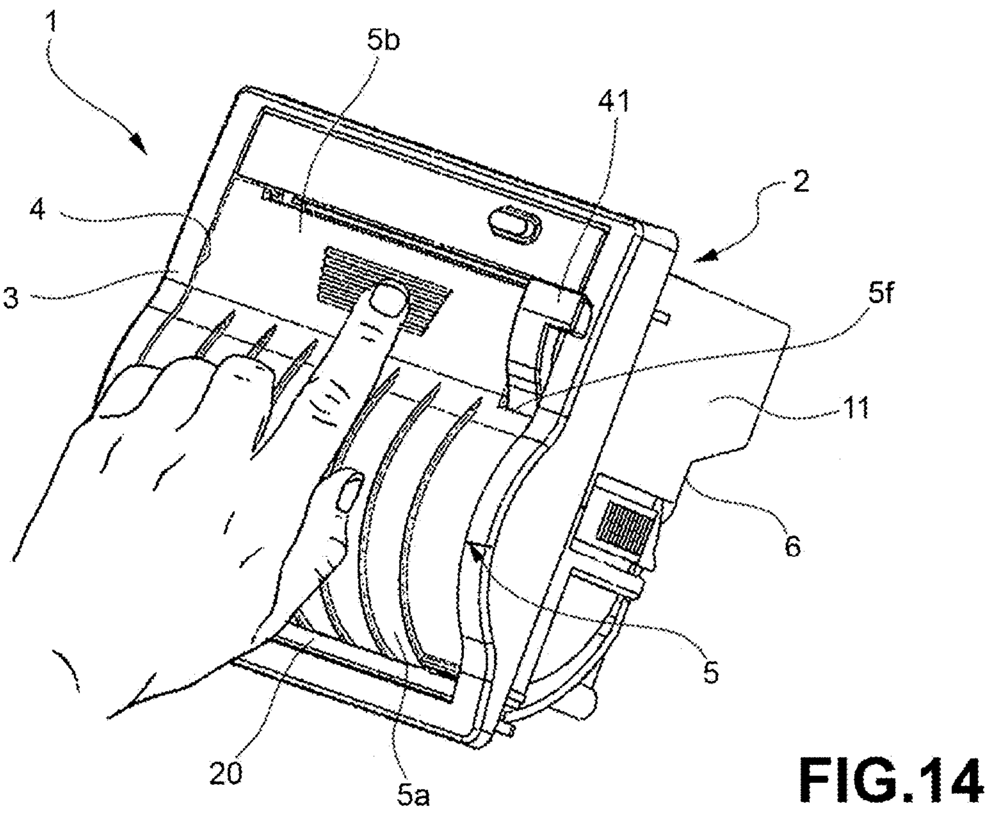
Figure 15:
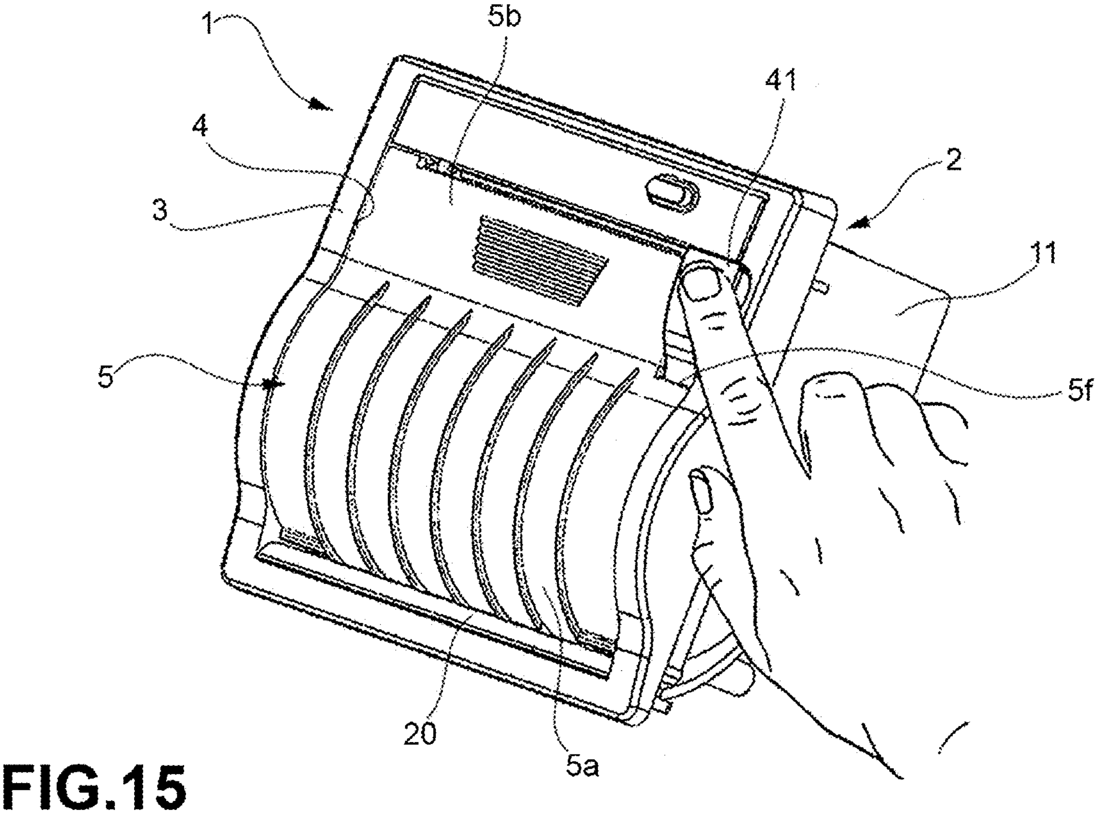

FIGS. 13*a* and 13*b* are exploded views of some components of the embodiment of FIG. 12; and FIGS. 14 and 15 represent different maneuvers for closing covers according to the invention.

In the drawings, a printer according to this invention is collectively referred to as 1.

In the embodiment illustrated in FIG. 1 through 11, the printer 1 comprises a support structure which is fixed in use, collectively referred to as 2. Said support structure 2 has a front portion 3 in the guise of a frame, which is in particular rectangular, in which an opening 4 is defined, which is likewise substantially rectangular in shape, with which a cover collectively referred to as 5 is associated.

Figure 1:
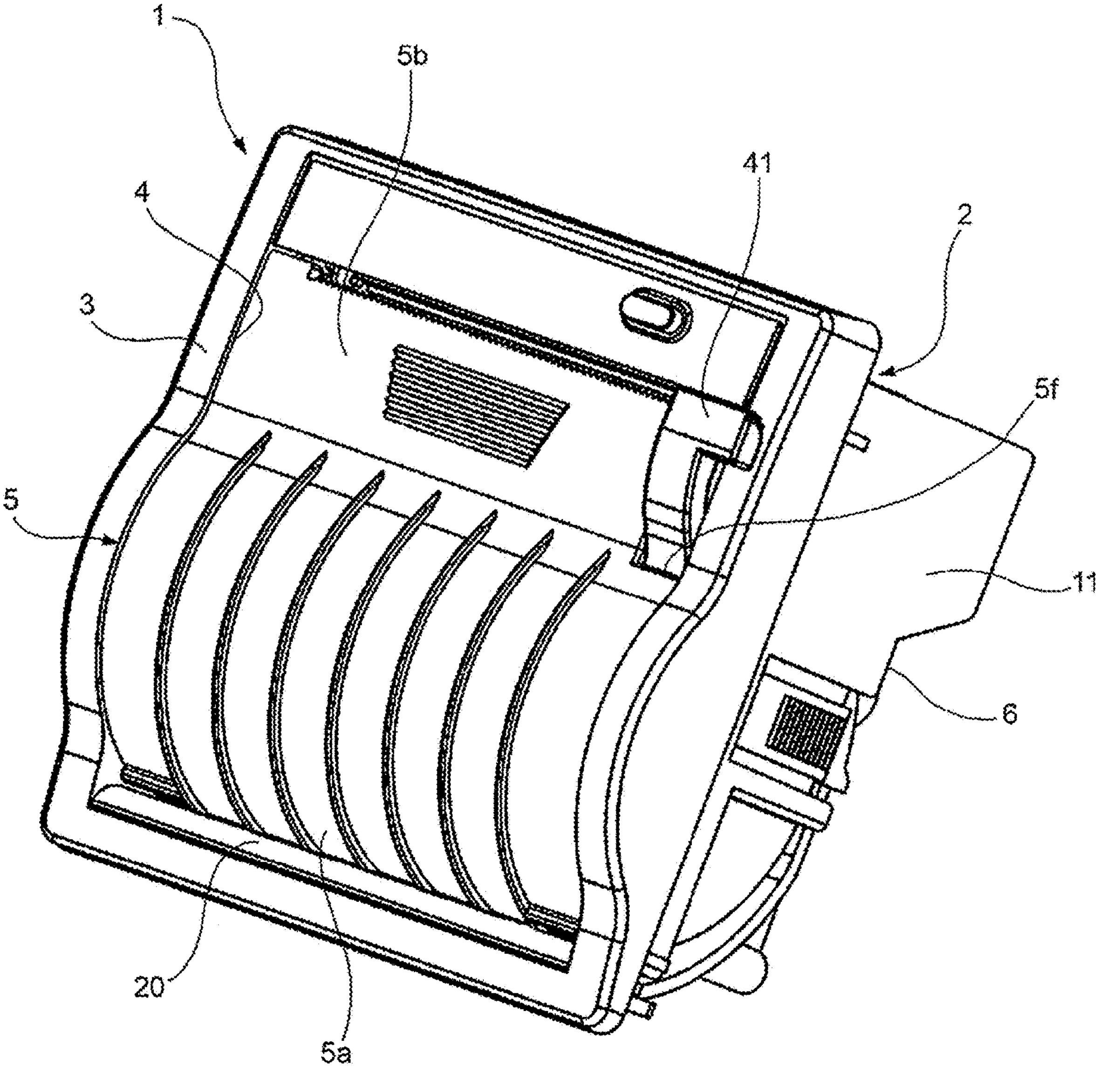
Figure 1A:
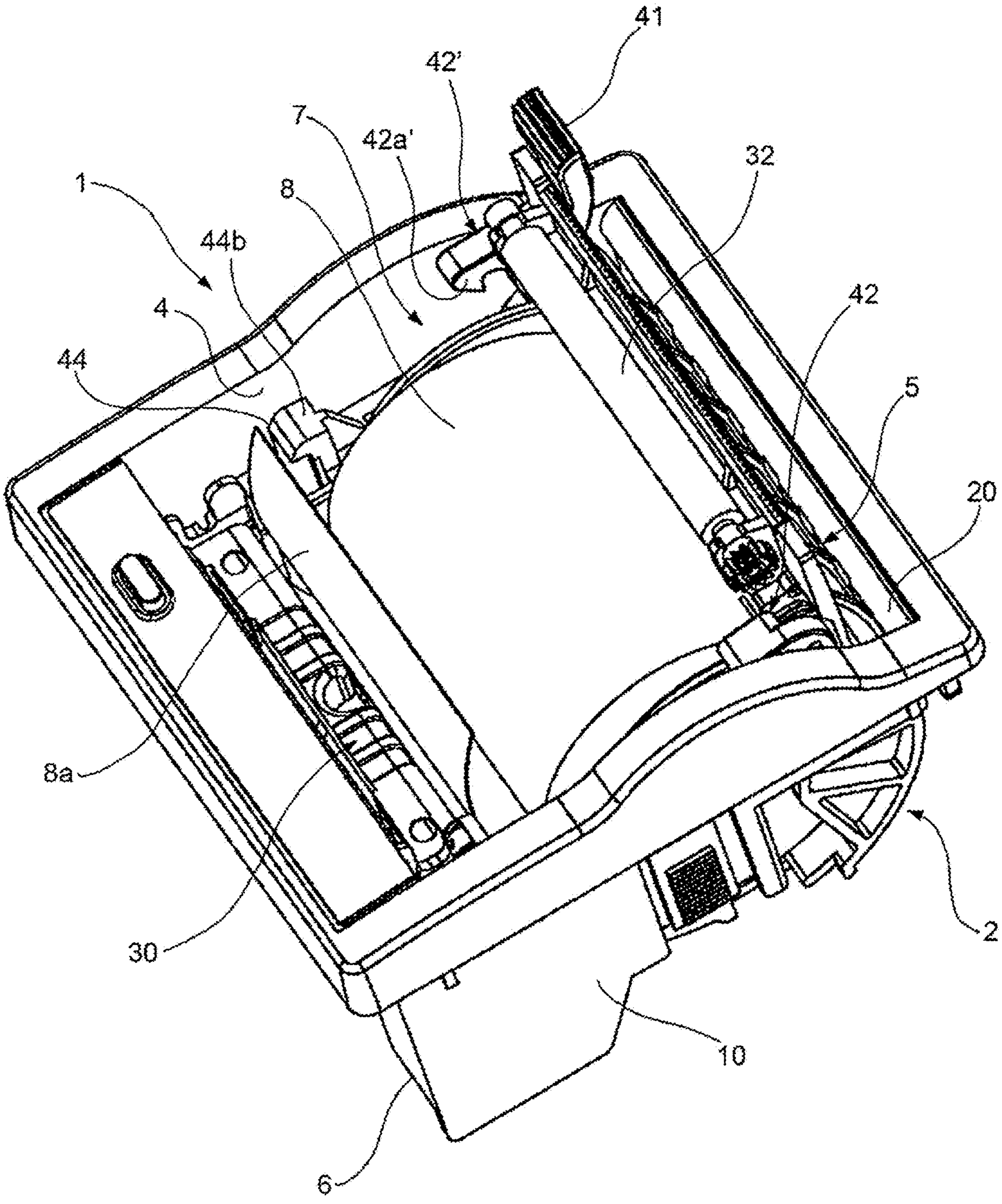
Figure 1B:
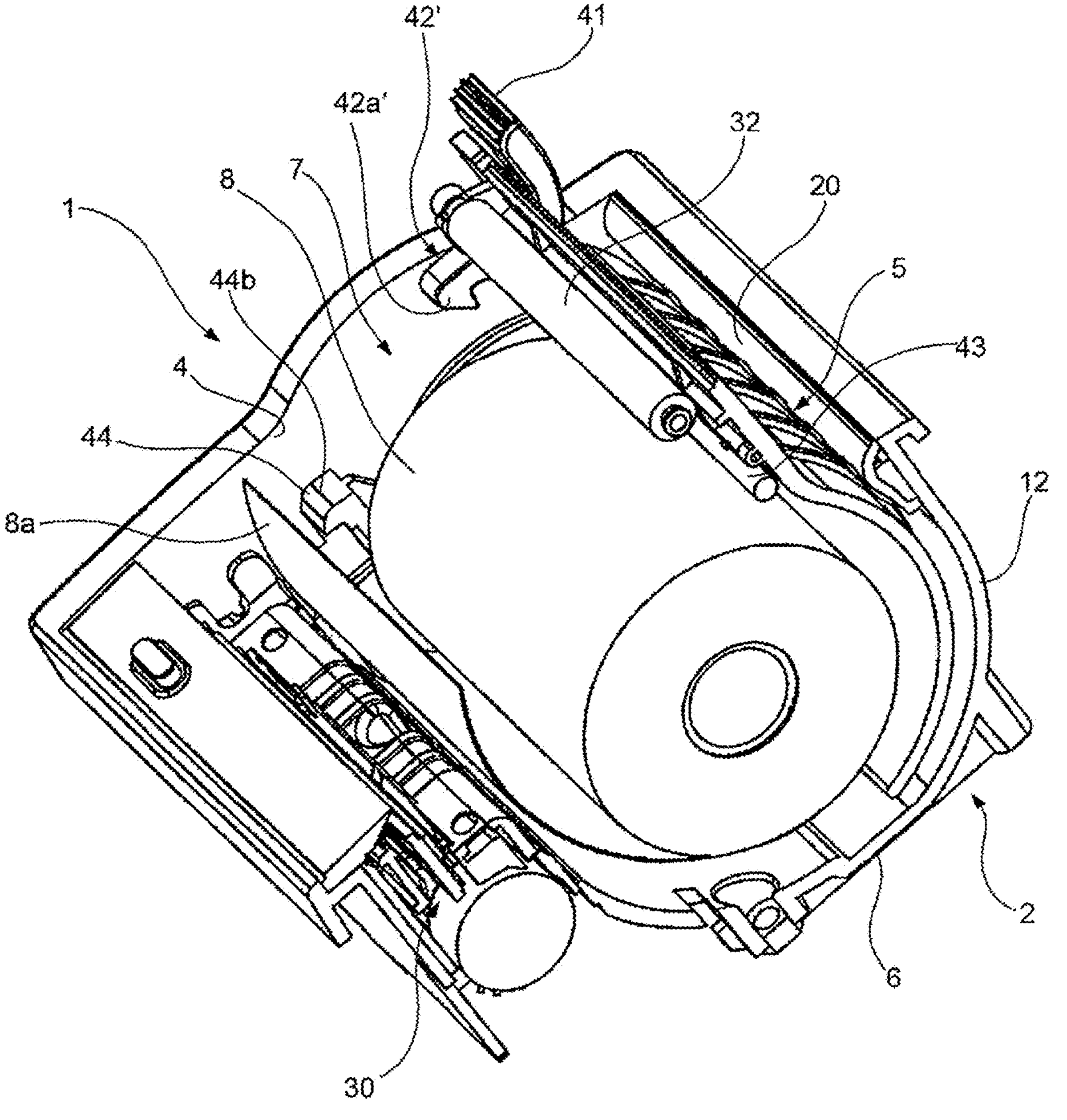
Figure 1C:
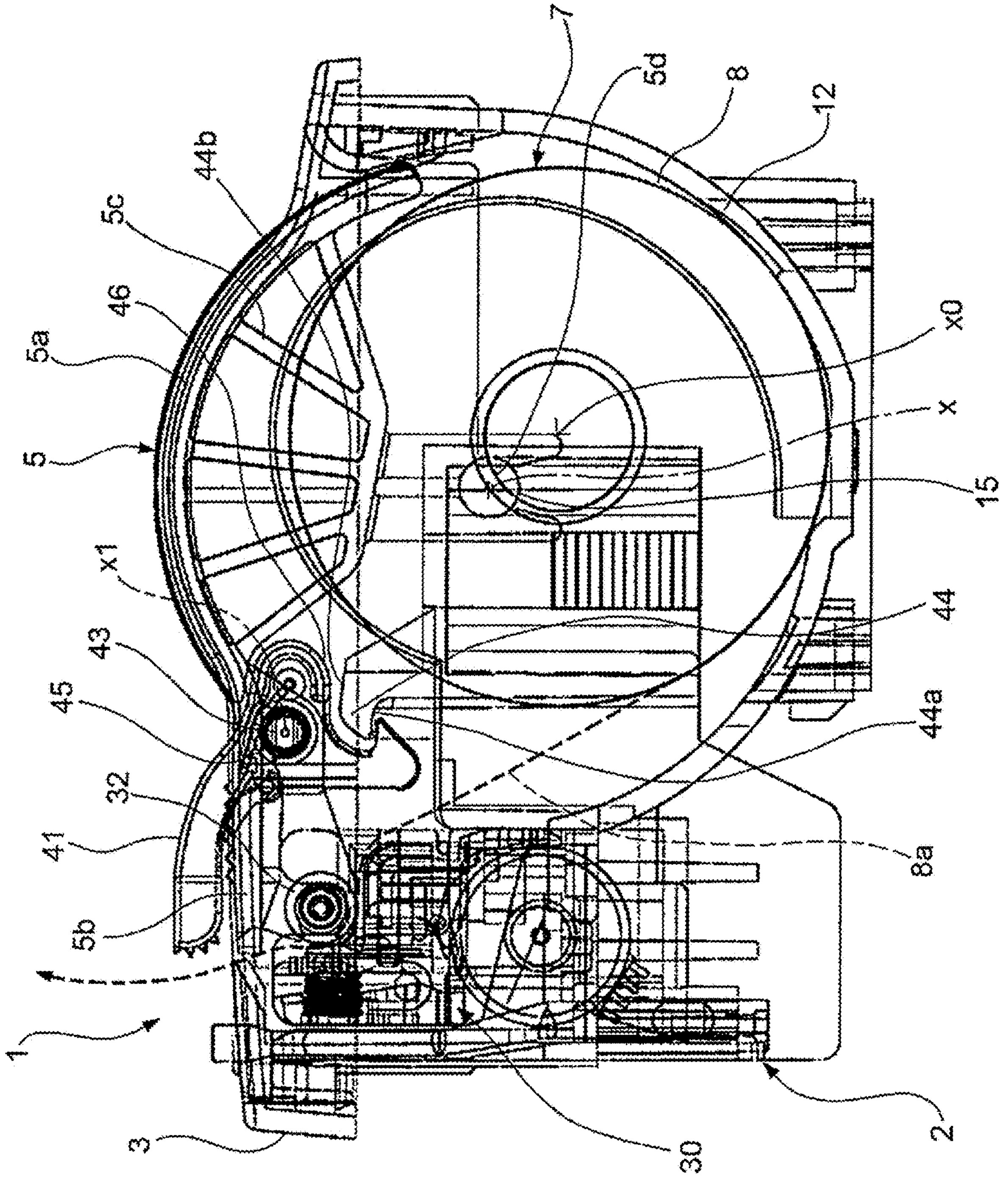
Figure 2:
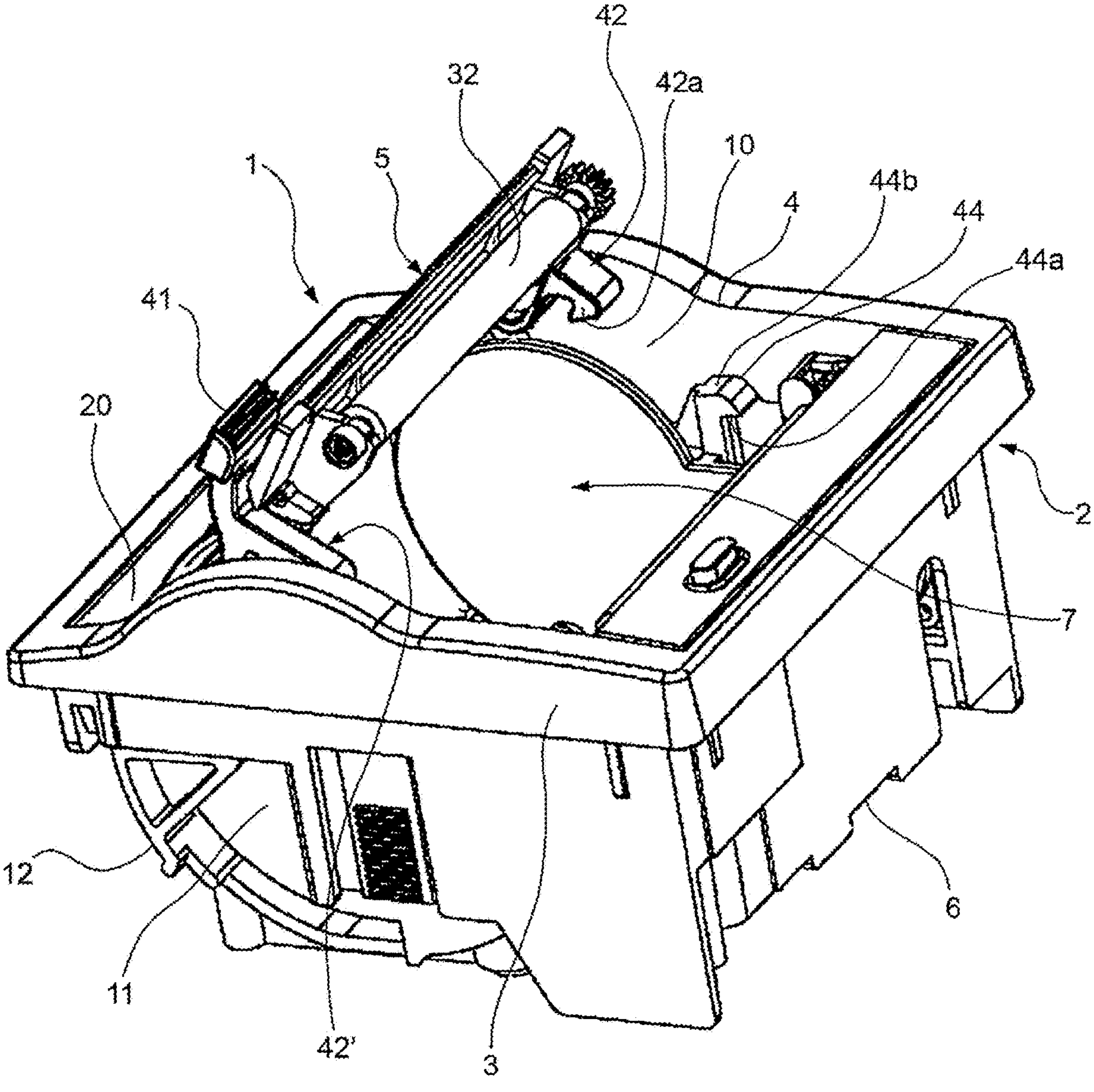
Figure 3:
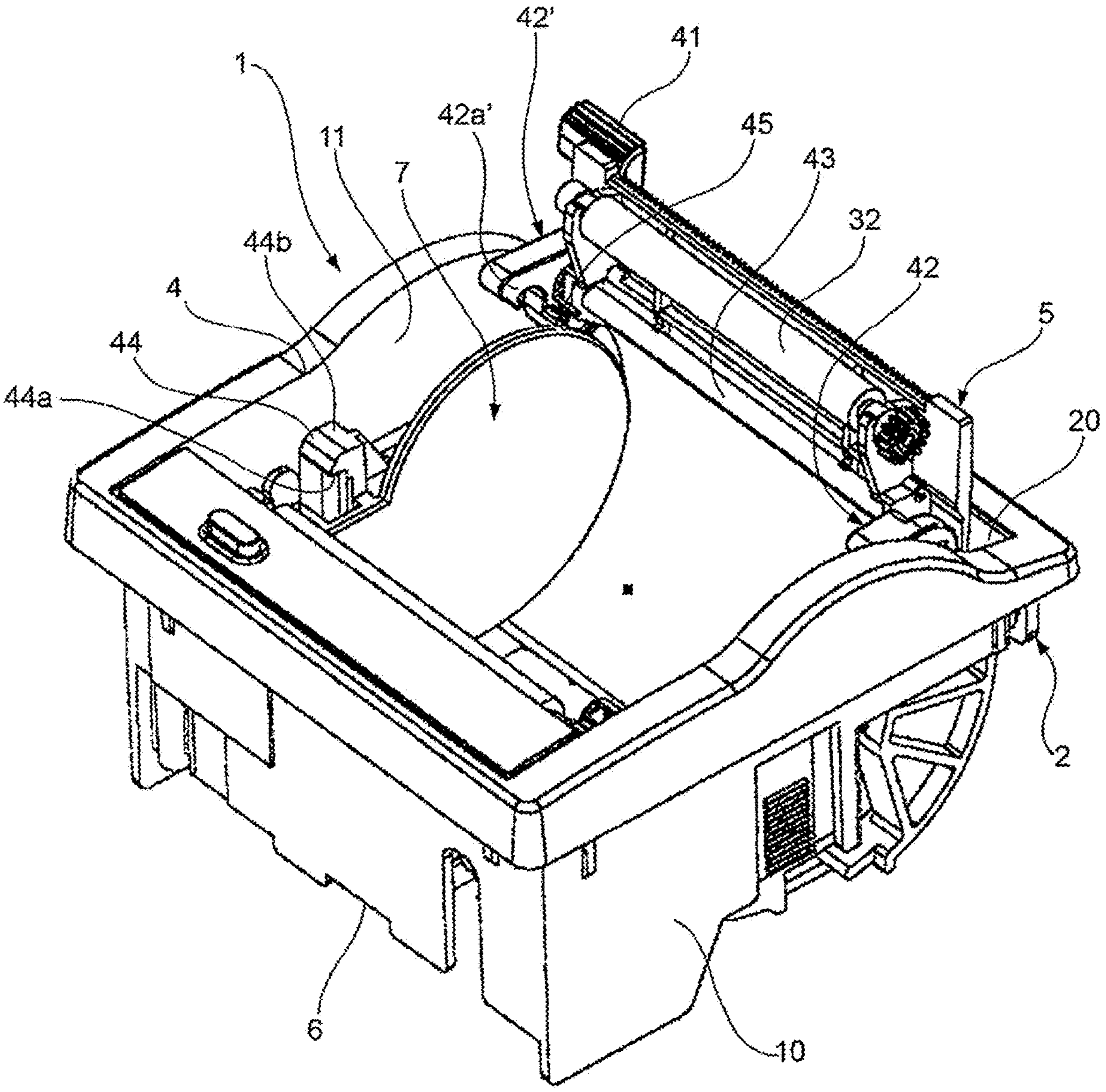

The support structure 2 also has a rear portion, collectively referred to as 6, extending from the framed front portion 3 and in which a receptacle 7 is defined adapted to receive a paper roll 8, shown in FIGS. 1*a* through 1*c*.

The receptacle 7 is facing and communicating with the opening 4 of the framed front portion 3.

Adjacent to the receptacle 7, in the support structure 2, in particular in its framed portion 3, a printing device is mounted, which is collectively indicated as 30, of a type known per se, including a thermal printing head.

Figure 4:
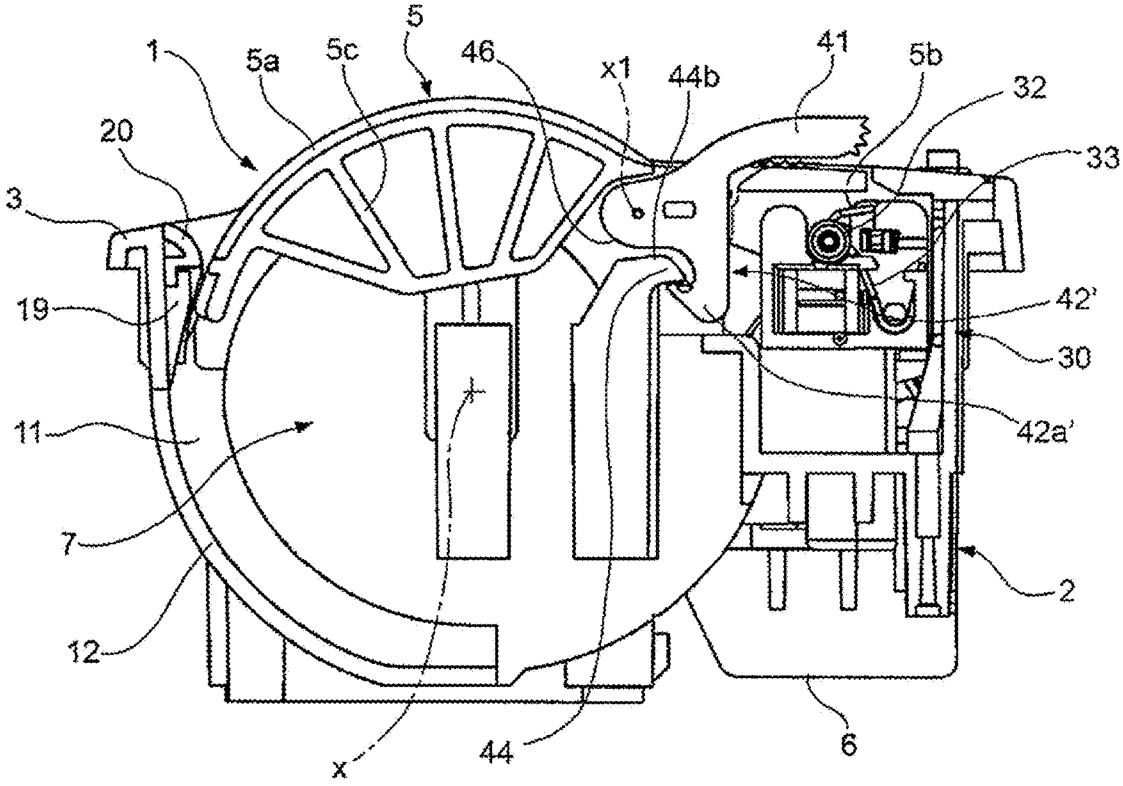
FIGS. 4 and 5 are cross-sectional views of the printer according to FIG. 1, showing the latching mechanism with the cover in the closed position and while unlocking the cover, respectively.

Referring in particular to FIG. 4, the receptacle 7 has two shaped walls with facing ends 10 and 11, between which an arched wall 12 extends.

In the embodiment illustrated by way of example, the cover 5 has a main shell portion 5*a*, and an adjacent auxiliary shell portion 5*b*, which are connected to each other forming a sort of cusp (see in particular FIGS. 1, 4, 5 and 10).

The main shell 5*a* is intended to cover the receptacle 7 in which the paper roll 8 is received.

A rubberized roller 32 for transporting the paper tape unwound from the roll 8, as well as associated transmission and rotation gears (see, for example, FIGS. 6 and 10), are mounted in the auxiliary shell 5*b*. The roller 32 and associated gears are able to couple/uncouple to/from the printing device 30 as a result of the closing/opening of the cover 5. In the coupled condition, the roller 32 allows the paper tape to be transported in the case of printing and ensures its contact with the surface of the print head; see in this regard FIG. 1*c*, where the output path of the paper tape 8*a* unrolled from the roll 8 is shown.

The printer may further comprise a latching system 33 configured to lock the cover 5 in the closed position. In the illustrated example, said latching system 33 is conventionally implemented as a spring acting to hold the transport roller 32, and thus the cover 33, in the closed position. However, such a configuration of the latching system is not essential for the purposes of the invention.

Figure 10:
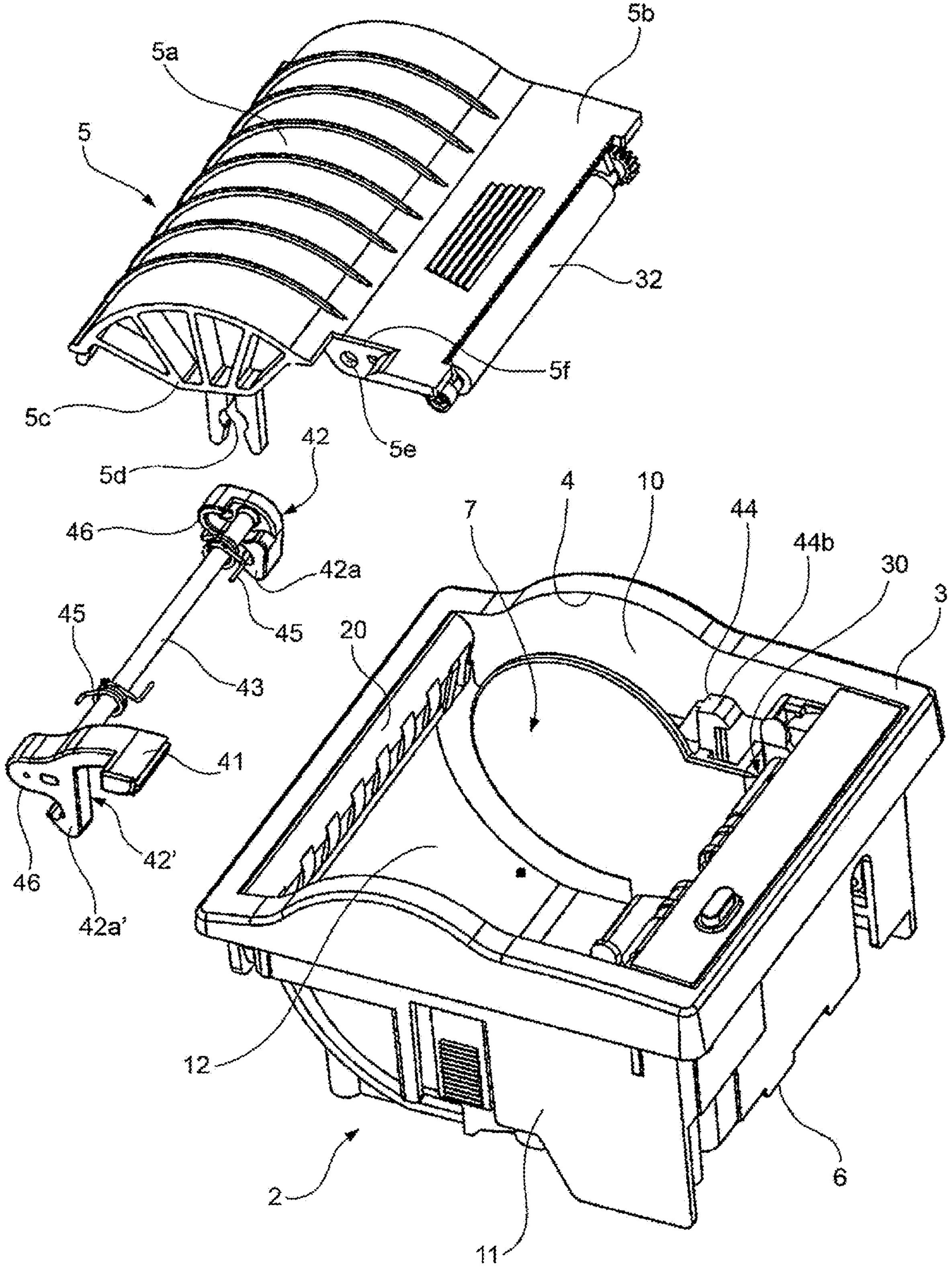
FIG. 10 is a partially exploded view of the printer according to FIG. 1.
Figure 11:
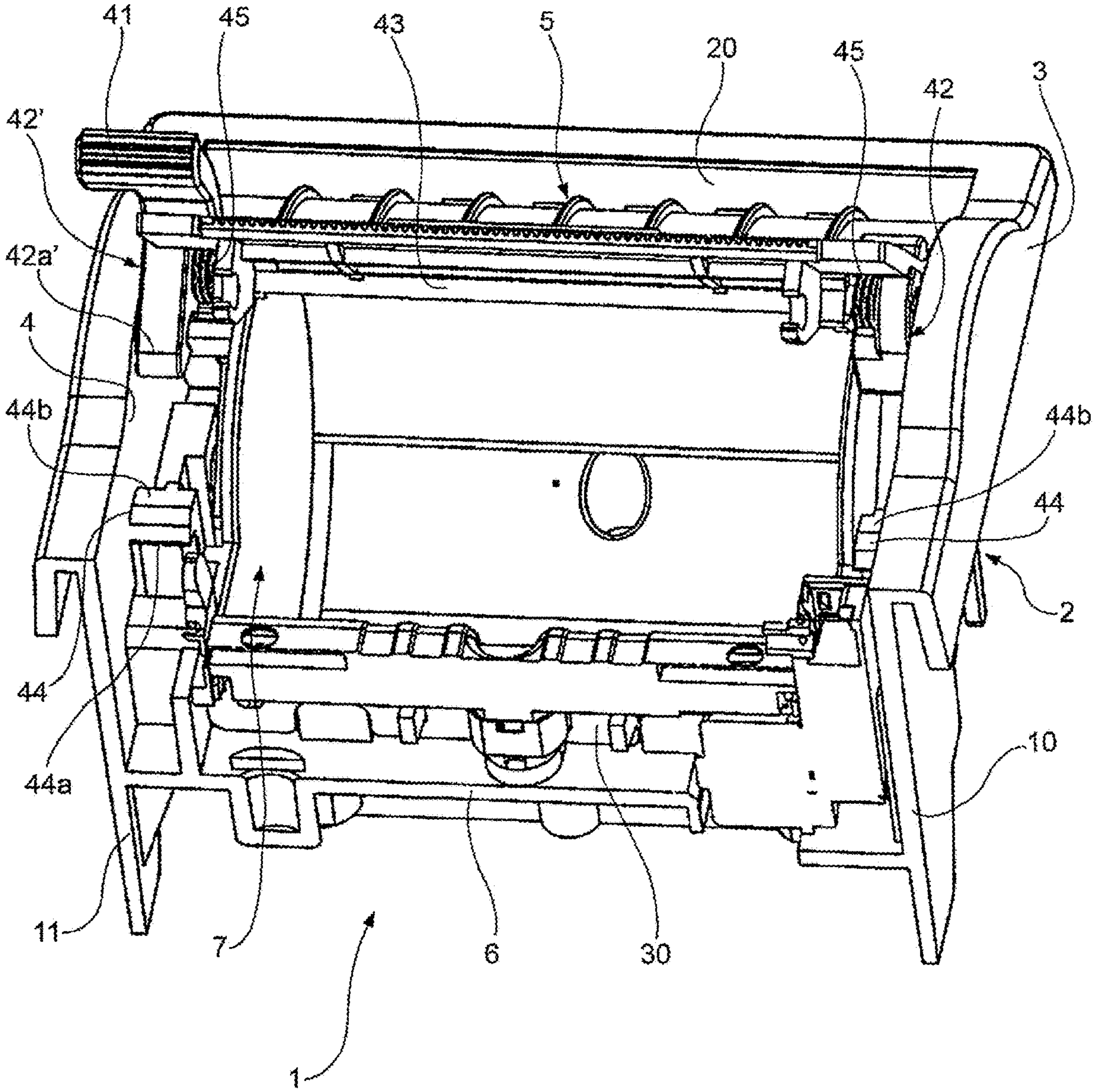
FIG. 11 is a further cross-sectional perspective view of the printer according to FIG. 1, with the cover in the open position.

As seen, for example, in FIG. 10, the cover 5 has at its ends two side formations 5*c* (only one of which is visible), essentially resembling walls in the form of circular sectors, provided with respective pluralities of radial stiffening ribs. Such side formations 5*c* of the cover are provided with respective circular end openings, indicated as 5*d*, for mounting on respective rotation pins 15 arranged on the end walls 10 and 11 of the receptacle 7 and shown in FIG. 6.

The oscillation axis x of the cover 5 relative to the support structure 2 is parallel to the axis x0 of the paper roll 8. In the illustrated example, the paper roll 8 is freely received within the receptacle 7; the roll unwinding axis x0 therefore is not fixed but is relatively free to float within the receptacle 7, as a function of the diameter of the paper roll 8 and the dimensions of the receptacle 7. According to alternative embodiments not shown, the paper roll 8 may be mounted on a shaft or spool attached to the support structure 2 or the cover 5.

The arrangement is such that the shell 5*a* of the cover 5 is slidable between the open and closed positions in a condition flanking the periphery (arched wall 12) of the receptacle 7 and, in the open position (see, for example, FIG. 3), said shell 5*a* extends substantially around the paper roll 8.

In the illustrated embodiment, in the open position of the cover 5, the shell 5*a* of said cover extends within the receptacle 7 provided for the paper roll 8.

In the framed portion 3 of the support structure 2 adjacent to the path of the shell 5*a* of the cover a cross member 19 is arranged, which bears a gasket 20 (FIG. 4-5) adapted to cooperate with the extrados surface of the shell 5*a*, to stabilize its positioning in the open and closed condition, and to prevent intrusion of foreign matter, including printed paper tape coming out of the printer.

The printer 1 further comprises at least one manually operable control member 41 for disabling the cover engagement system 5 and thereby unlocking the cover 5 from the closed position. The control member 41 is also used to draw the cover 5 from the closed position to the open position. In the illustrated example, the control member 41 is implemented as a control lever. According to alternative embodiments not shown, the control member 41 may be implemented as a chain or cable.

Also connected to the control member 41 is a pair of operating elements 42, 42' articulated to the cover 5 about an axis x1 substantially parallel to the rotation axis x of the cover 5. Specifically, the operating elements 42, 42' are keyed to a single rotational shaft (or other joining element) 43, which is in turn rotationally mounted to support holes 5*e* formed in the cover 5. The operating elements 42, 42' are configured to engage respective striker elements 44 arranged on opposite flanks of the support structure 2, in particular at the end walls 10, 11 of the support structure 2. According to an alternative embodiment, not shown, there may be only one operating element and, consequently, only one striker element.

In the illustrated example, the operating elements 42, 42' are configured as latching elements, and for this reason will also be designated as such in the following. Each latching element 42, 42' comprises a respective hook appendage 42*a*, 42*a'* configured to latch to the respective striker element 44.

The engagement between the latching elements 42, 42' and the striker elements 44 allows the cover 5 to be locked in the closed position. For this purpose, at least one elastic member 45 is provided, which in the illustrated example is formed of two torsion springs coaxially mounted on the rotation shaft 43 and having one end pressing on the respective coupling element 42, 42' and the other end pressing on the cover 5. The elastic member 45 is configured to stress the engagement elements 42, 42' in a direction of rotation (clockwise, according to the embodiment of FIG. 6) that is concordant with the direction of rotation of the cover 5 from the open position to the closed position (clockwise, according to the embodiment of FIG. 6).

Thus, the latching elements 42, 42' provide a latching system for the cover 5 in place of, or in addition to, other conventional latching systems present in the printer 1, for example the latching system provided by the spring 33.

The control member 41 is rotatably integral with the latching elements 42, 42' and is operable to rotate the latching elements 42, 42' in a direction of rotation (counterclockwise, according to the embodiment of FIG. 6) concordant with the direction of rotation of the cover 5 from the closed position to the open position (counterclockwise, according to the embodiment of FIG. 6), to disengage the latching elements 42, 42' from the respective striker elements 44.

The control member 41 is arranged on a flank of the cover 5, in particular in a slit **5*f* formed on a side edge of the cover 5. The control member 41 is directly connected to, for example made in one piece with, one of the operating elements, namely that indicated as 42' in the drawings. These measures allow for a simple and compact structural configuration to be obtained, without sacrificing the functionality of the device. According to another embodiment, which is equally compact and particularly easy to operate, there may be two control members 41 which are respectively connected to the two operating elements 42, 42'**.

Figure 5:
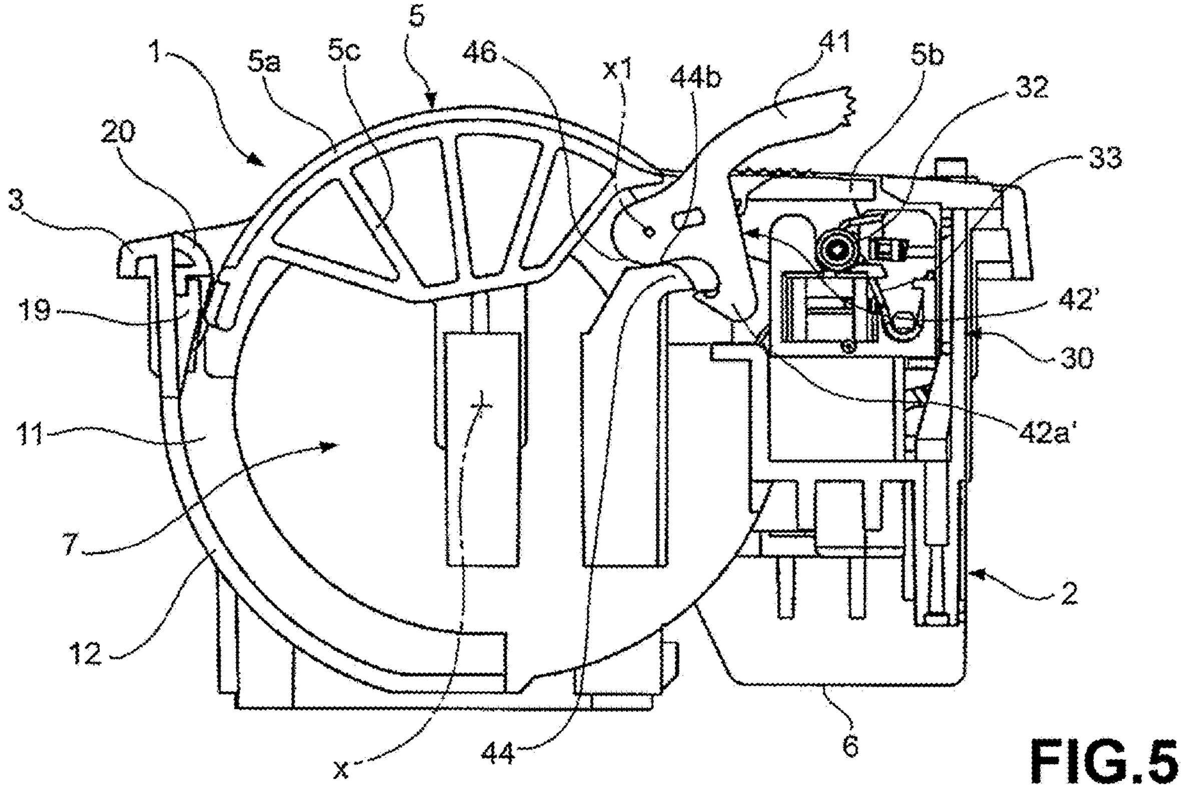
Figure 6:
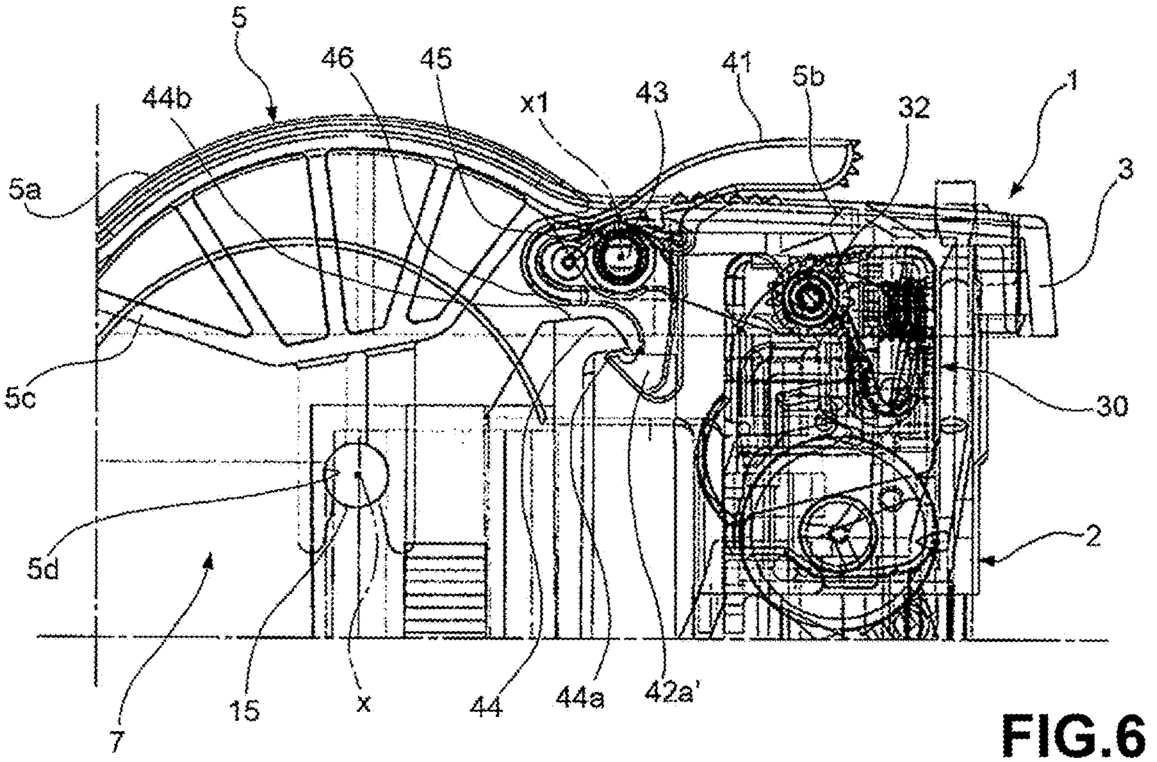
FIG. 6 is a wireframe representation of the printer according to FIG. 1, shown with the cover in the closed position.
Figure 7:
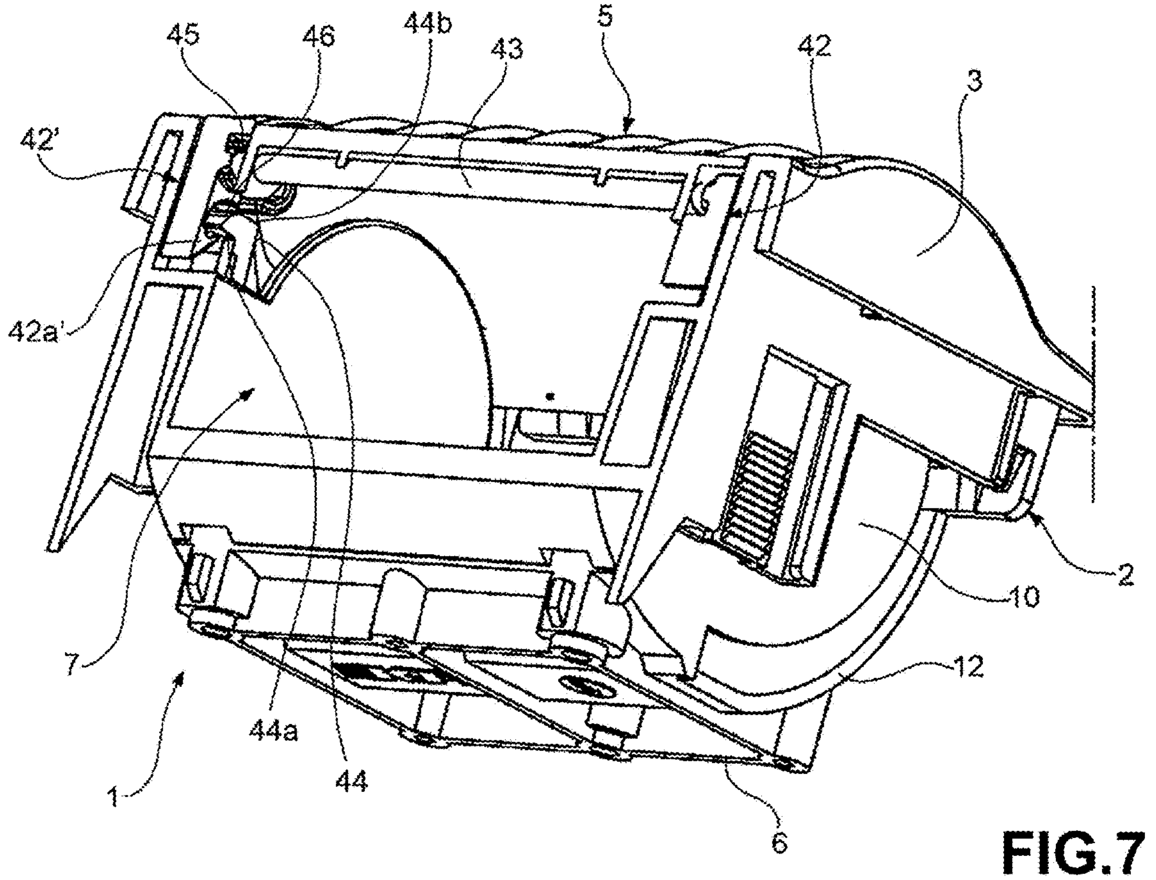
FIG. 7 through 9 are cross-sectional perspective views of the printer according to FIG. 1, with the cover in the closed position.
Figure 8:
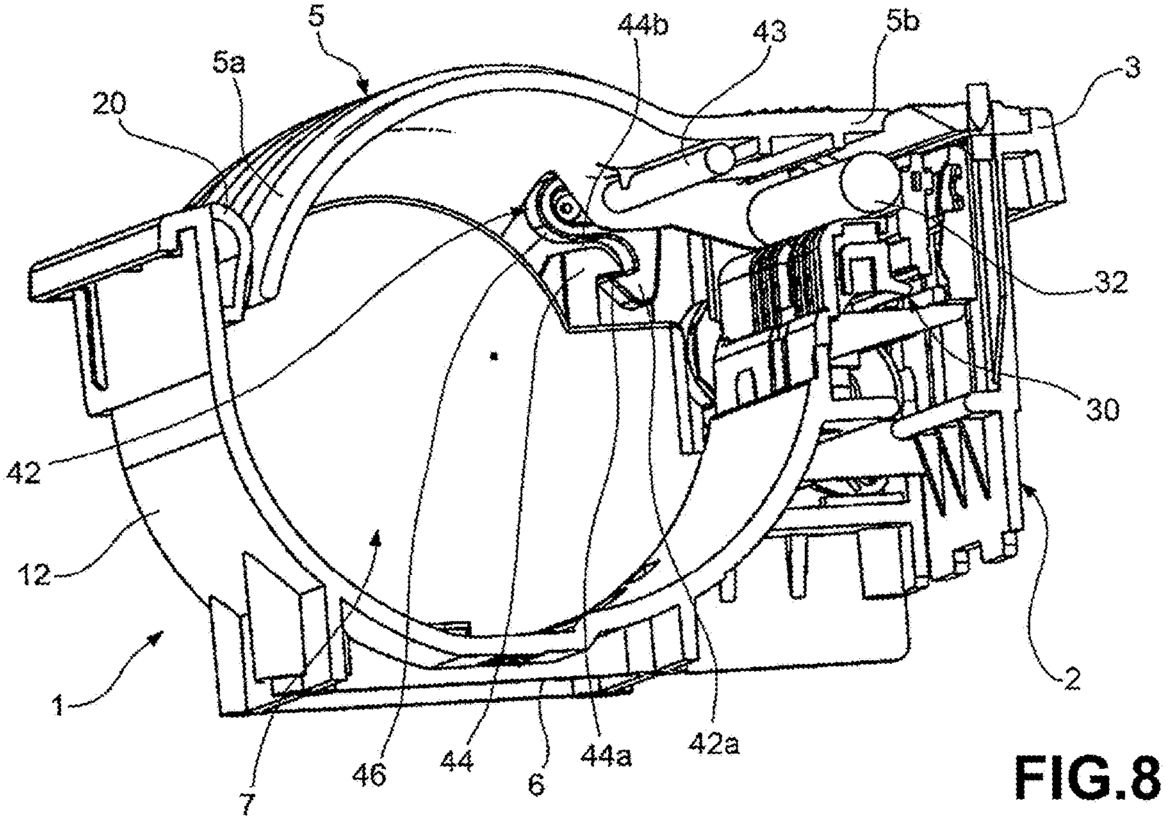
Figure 9:
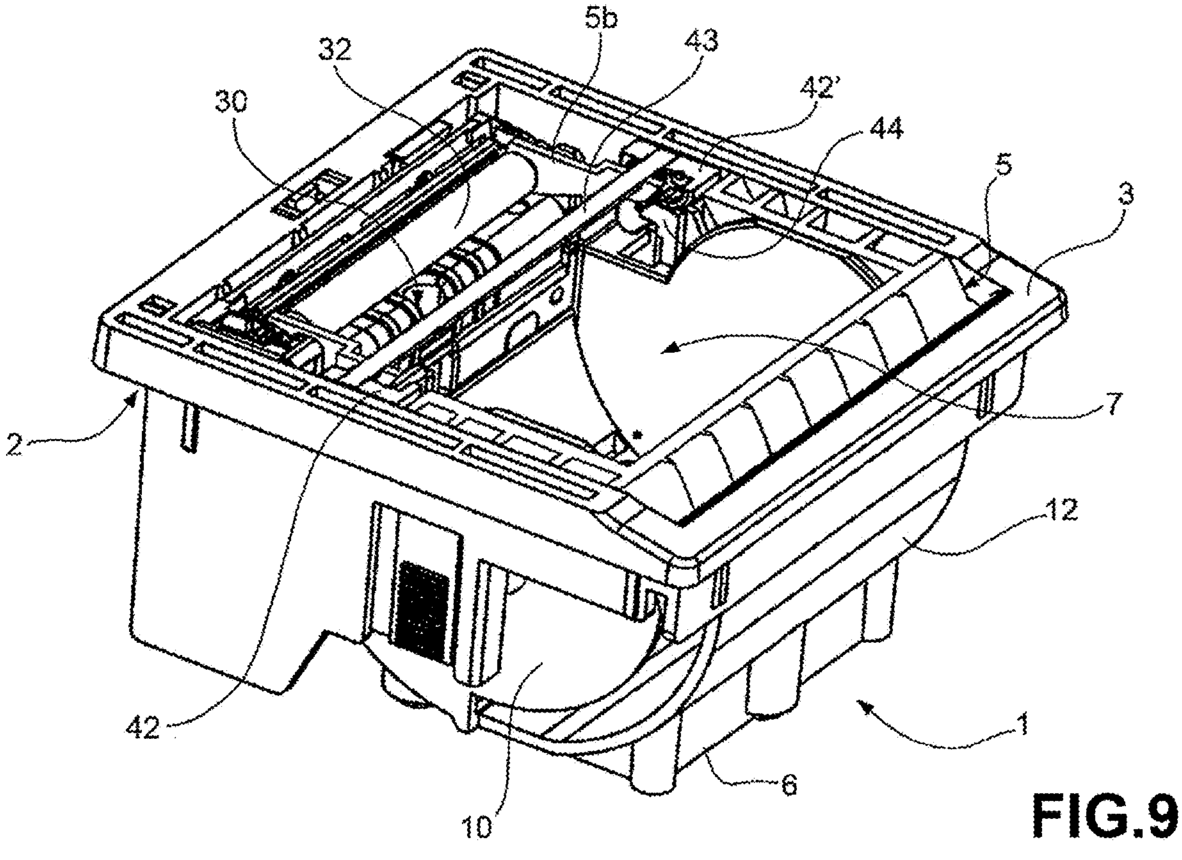

As may be seen particularly in FIGS. 4 and 5, each of the operating elements 42, 42' comprises a cam profile 46 configured to cooperate with the respective striker element 44 to cause the cover 5 to rotate relative to the support structure 2 when the control lever 41 is subjected to rotation relative to the cover 5.

In practice, the operating element 42, 42', or rather its hook appendage **42*a*, 42*a*', engages a first surface 44*a* of the respective striker element 44 to latch to the respective striker element 44 (FIG. 4). On the other hand, the cam profile 46 engages a second surface 44*b* of the respective striker element 44 when the control lever 41 is subjected to rotation. The first surface 44*a* and second surface 44*b* are arranged on opposite sides of the respective striker element 44**.

According to an alternative embodiment, which is not illustrated, the operating elements 42, 42' may be devoid of the latching functionality, and thus act only with the cam profiles 46. In this case, it is necessary for the printer 1 to have another latching system for locking the cover 5 in the closed position, such as the latching system provided by the spring 33. According to an alternative embodiment, which is not illustrated, the operating elements 42, 42' may be provided with only the latching functionality, and thus be devoid of the cam profiles 46.

With the device described above, to unlock and open the cover 5, it is sufficient to pull, for example with a finger, the control lever 41, and then maintain the movement to bring the cover to the fully open position. Due to the action of the cam profile 46, the cover 5 is initially rotated a few degrees, preventing an accidental release of the control lever 41 from re-engaging the latching elements 42, 42'.

With the arrangement described above, it is therefore possible to unlock and open the printer cover with one finger in an intuitive motion The printer 1 described above may be embedded in a corresponding opening arranged in a panel for use in a vertical position or in a horizontal position. Alternatively, the printer may be embedded in the mouth of a hollow, box-like body.

Expediently, in the auxiliary shell **5*b* of the cover 5, guide rollers and part of a cutting device may be mounted, which cutting device is intended for cutting the paper tape unwound from the roll 8 and printed by means of printing devices known per se, attached to the frame portion 3 of the support structure 2**.

Although the above-described invention is applied to a retractable sliding cover, it may in fact be applied to other types of covers, such as tilting covers commonly used in the industry.

FIGS. 12 and **13*a-b* show a second embodiment of the invention, which differs from the previous one in that the control member 41, obtained as a control lever rotatable about the axis x1, is not rotationally integral with the respective operating member 42'. Between the two elements there is in fact the possibility of relative motion of a certain angle. As in the embodiment of FIG. 1-11, the elements 42, 42' are rotationally integral with the joining element or shaft 43. In contrast to the embodiment of FIG. 1-11, the control member 41 is rotatable by a certain angle relative to the connection element 43. In the illustrated example, this is achieved by the fact that an end 43*a* of the connection element 43 is inserted into a corresponding slot 41*a* obtained in the body of the control member and shaped in such a way as to allow a relative rotation of a certain angle between the control member 41 on the one hand, and the assembly formed by operating elements 42', 42 and connection element 43** on the other.

Like the embodiment of FIG. 1-!!, that of FIGS. 12 and **13*a*-13*b* allows the cover 5 to be closed and locked by manually acting on the cover to push it from the open position to the closed position until the corresponding latching system is engaged (FIG. 14). If, in the embodiment of FIG. 1-11, an attempt were instead made to close the cover 5 by pushing with the control member 41, the opposition between the engagement appendage 42*a*' and the corresponding striker 44 would prevent, or otherwise make it difficult, to overcome the striker element 44 that is required to bring the system into engagement. In the embodiment of FIGS. 12 and 13*a-b*, this inconvenience is overcome by the fact that, since the connection between the control member 41 and the latching element 42' is relatively loose, when the control member 41 is pushed, the latching element 42' may perform a certain rotation relative thereto (induced by the elastic member 45) allowing the striker element 44 to be overcome, and therefore the latching elements 42, 42' to engage in the respective striker elements 44 (FIG. 15 shows the closing maneuver in which the control member 41** is activated by pushing). The effect described above may be achieved by other means than the one described above (shaped slot), for example by means of abutment surfaces between the control member and the respective coupling element.

Naturally, without prejudice to the principle of the invention, the embodiments and the details of construction may vary widely with respect to that which has been described and illustrated purely by way of non-limiting example, without thereby departing from the scope of the invention as defined in the appended claims.

What is claimed is:

1. A printer comprising:

a support structure which is fixed in use, and in which a receptacle is formed for receiving a roll of paper tape which is unwound in use by rotation about an axis, a cover which is hinged to said structure about a rotation axis substantially parallel to the unwinding axis of said roll of paper tape, and which is oscillatable between a closed position and an open position in which it covers and uncovers said receptacle, respectively, a printing device carried by the support structure, a transport roller for paper tape unwound from said roll of paper tape, cooperating with the printing device; said roller being carried by the cover in such a way that it is coupled to or uncoupled from the printing device as a result of the closing or opening of the cover;

a latching device configured to lock the cover in the closed position; and at least one control member arranged on at least one flank of the cover and manually operable to disable the latching device and unlock the cover from the closed position, wherein said at least one control member is connected to at least one operating element arranged on at least one flank of the cover and hinged to said cover about an axis substantially parallel to the rotation axis of the cover, wherein said at least one operating element is configured to engage at least one striker element arranged on at least one flank of the support structure, at least one elastic member being associated with said at least one operating element, said at least one elastic member being configured to urge said at least one operating element in a same rotation direction as the rotation direction of the cover from the open position to the closed position, wherein said at least one control member is operable to rotate said at least one operating element in a same rotation direction as the rotation direction of the cover from the closed position to the open position, to unlock the cover from the closed position, and wherein said at least one control member is rotatable by a given angle relative to said at least one operating element and is coupled to said at least one operating element by said at least one elastic member.

2. The printer according to claim 1, wherein said at least one operating element comprises a pair of operating elements arranged on opposite flanks of the cover and fixed to each other by a connection element, wherein said at least one striker element comprises a pair of striker elements arranged on opposite flanks of the support structure, said pair of operating elements being configured to engage said pair of striker elements.

3. The printer according to claim 1, wherein said at least one operating element comprises at least one latching element configured to engage said at least one striker element to lock the cover in the closed position, wherein said at least one elastic member is configured to urge said at least one latching element in a same rotation direction as the rotation direction of the cover from the open position to the closed position, wherein said at least one control member is operable to rotate said at least one latching element in a same rotation direction as the rotation direction of the cover from the closed position to the open position, to disengage said at least one latching element from said at least one striker element.

4. The printer according to claim 3, wherein said at least one latching element comprises a hook appendage configured to latch onto said at least one striker element.

5. The printer according to claim 1, wherein said at least one operating element comprises at least one cam profile configured to cooperate with said at least one striker element to cause the cover to rotate relative to the support structure when said at least one operating element is subjected to a rotation relative to the cover according to a same rotation direction as the rotation direction of the cover from the closed position to the open position.

6. The printer according to claim 5, wherein said at least one operating element comprises at least one latching element configured to engage said at least one striker element to lock said cover in the closed position, wherein said at least one resilient member is configured to urge said at least one coupling element in a same rotation direction as the rotation direction of the cover from the open position to the closed position, wherein said at least one control member is operable to rotate said at least one latching element in a same rotation direction as the rotation direction of the cover from the closed position to the open position, to disengage said at least one latching element from said at least one striker element, and wherein said at least one latching element is configured to engage a first surface of said at least one striker element to engage said at least one striker element, wherein said at least one cam profile is configured to engage a second surface of said at least one striker element, said first and second surfaces being arranged on opposite sides of said at least one striker element.

7. The printer according to claim 1, wherein said at least one control member is rotationally fixed to said at least one operating element.

8. The printer according to claim 1, wherein said at least one control member is formed by at least one control lever hinged to said cover about the axis of said at least one operating element.

* * * * *